Figure 2B:
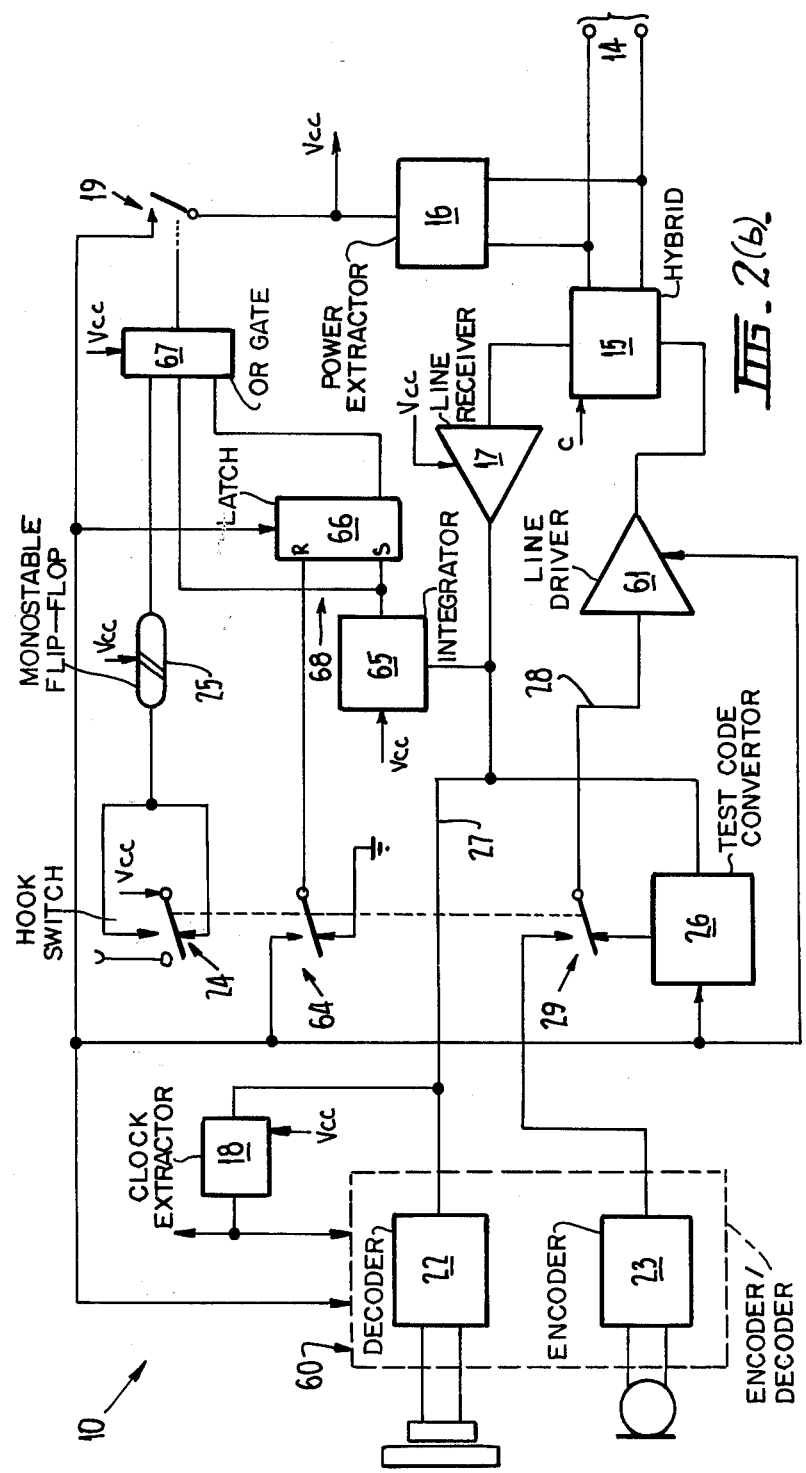

United States Patent [19]

Rule et al.

[11] 4,070,554

[45] Jan. 24, 1978

[54] DIGITAL TESTING AND POWER CONTROL IN A DIGITAL COMMUNICATION SYSTEM

[75] Inventors: Peter Rule, Dallas; Owen Mace, South Yarra; Ernest Zimmer, Pascoe Vale, all of Australia

[73] Assignee: L.M. Ericcson Pty. Ltd., Broadmeadows, Australia

[21] Appl. No.: 701,738

[22] Filed: June 30, 1976

[30] Foreign Application Priority Data

June 30, 1975  Australia .............................. 2155/75

[51] Int. Cl.$^2$ ............................................. H04B 3/46
[52] U.S. Cl. .............................. 179/175.3 R; 179/2 A
[58] Field of Search .................. 179/175.3 R, 2 A, 77, 179/81 R; 324/57 DE; 178/69 A; 340/146.1 E

[56] References Cited

U.S. PATENT DOCUMENTS

| | | | |
|---|---|---|---|
| 3,069,498 | 12/1962 | Frank | 178/69 A |
| 3,655,915 | 4/1972 | Liberman et al. | 179/175.3 R |
| 3,769,454 | 10/1973 | Liberman et al. | 179/175.3 R |
| 3,786,187 | 1/1974 | De Vita et al. | 179/175.3 R |
| 3,906,174 | 9/1975 | Dotter | 179/175.3 R |

FOREIGN PATENT DOCUMENTS 2,031,212  11/1971  Germany .............................. 179/2 A

*Primary Examiner* — Douglas W. Olms
*Attorney, Agent, or Firm* — Cushman, Darby & Cushman

[57] ABSTRACT

The invention is concerned with digital communication systems and there is disclosed a digital telephone system wherein any digital telephone may be switched, by control from a local exchange, between a power-up state wherein continuous operating power is consumed by the telephone and a power-down state wherein the telephone is effectively turned off except for the consumption of a small amount of power sufficient only to enable communication between the telephone and the exchange. A telephone is powered-up by detecting, at the telephone, a control signal in the digital data transmitted from the exchange to the telephone. Each telephone includes a detection circuit for detecting the control signal and actuating a power rationing switch to switch the telephone to the power-up state. The power rationing switch may also be actuated momentarily when the telephone goes from the idle to busy condition to initiate a call so as to signal the exchange of the requirement for full operating power. The exchange is capable of deciding whether a telephone wishing to power-up can do so without causing exceeding of an allowable sum of power ration for the telephones of the system. A test center for digitally testing the lines between the exchange and the telephones is also disclosed. The test center causes a digital test signal to be transmitted from the exchange to a telephone at the end of a line under test wherein it is modified in a particular way and transmitted back to the exchange. The returned test signal is compared, at the test center, with a similarly modified non-transmitted test signal enabling a count of the errors to be made. The S/N ratio on the line under test is reduced to increase the errors.

21 Claims, 4 Drawing Figures

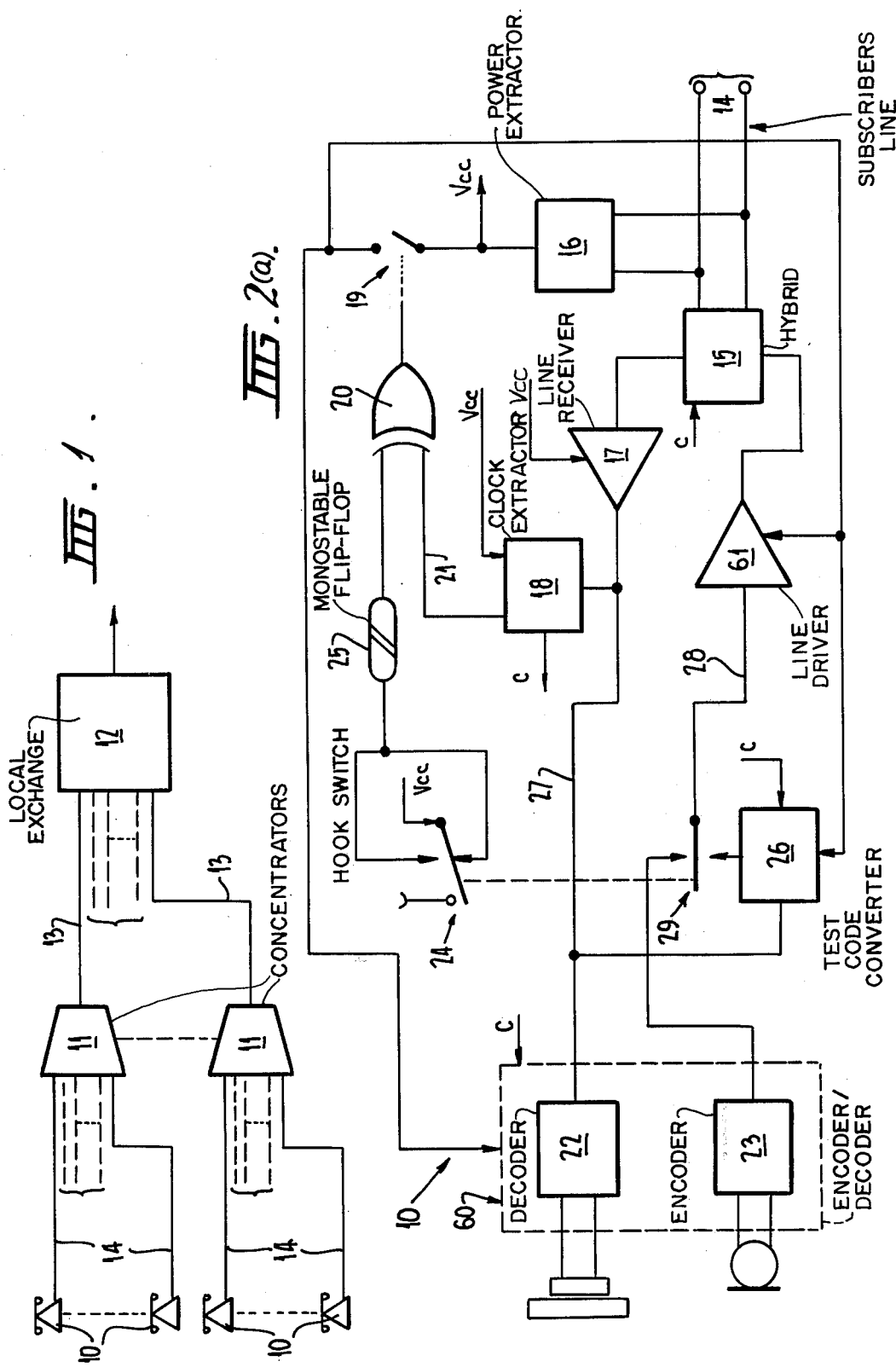

DIGITAL TESTING AND POWER CONTROL IN A DIGITAL COMMUNICATION SYSTEM

The present invention relates to digital communication systems and more particularly to a method and apparatus for controlling the power state of remote data terminals and digitally testing the lines to and from the remote terminals in a system of the kind wherein power for the remote terminals is supplied from a central (local) exchange. The invention is discussed hereinbelow in relation to a telephone system wherein the remote data terminals are digital telephones but it should be appreciated that it could be easily applied to other digital systems wherein power is supplied to remote terminals from a central device.

In conventional analogue telephone systems, power for the subscriber telephones is commonly sent from the local exchange to each telephone down a dedicated cable pair which connects each telephone to the exchange. Therefore, there is no real problem in sending power to the telephone and the power is under switch-hook control at the telephone. The exchange has a capacity sufficient to power-up as many of the telephones as go off-hook or require power for ringing. However, in an integrated digital telephone system digital concentrators are relatively simple and inexpensive devices and it would be desirable to use a concentrator between the local exchange and a group of subscriber telephones in order to reduce the amount of expensive cable necessary. Power to the telephones and concentrators would be supplied by the exchange along a main cable to the concentrator and then be distributed to the telephones along individual cable pairs. A problem would exist in that the amount of power required by the telephones and concentrator would exceed the amount of power which can be carried by the main cable in unusual circumstances assuming of course that the main cable is designed for average peak load conditions, that is, for maximum efficiency. In other words, in unusual circumstances, if an excessive number of telephones go into the off-hook condition at the same time thus requiring further power, it will cause the power supplies to sag and connected calls may fail.

A further problem which arises in digital systems concerns automatic testing of subscriber lines. In an analogue system there is always the capability for obtaining a metallic connection between an exchange of the system and a subscriber telephone and it is usual to test the line by measuring the insulation resistance of the line by some means arranged at the exchange whilst the telephone is in the on-hook condition. It would be impractical in a digital system to provide a metallic connection around digital concentrators, digital exchanges and the like and therefore it may become desirable to provide some form of digital testing which does not require such a metallic connection. However, it is conceivable that in order to allow digital testing it would be necessary to provide a circuit through the digital telephones and this can only be done if the telephones are in the power-up state, assuming of course that they are to remain on-hook. The problem can be overcome simply by having all the telephones of a system continuously in the power-up state, that is, supplied with full operating power but this would create the same problems as occur in the emergency conditions discussed above and also would be inefficient.

It is therefore one object of the present invention to provide a method and apparatus for controlling the power state of digital terminal devices in a system of the kind hereinbefore defined, which method and apparatus overcomes one or both of the abovementioned problems.

It is a further object of the invention to provide a method of testing lines to and from remote digital terminal devices, in a system of the kind hereinbefore defined.

Figure 3:
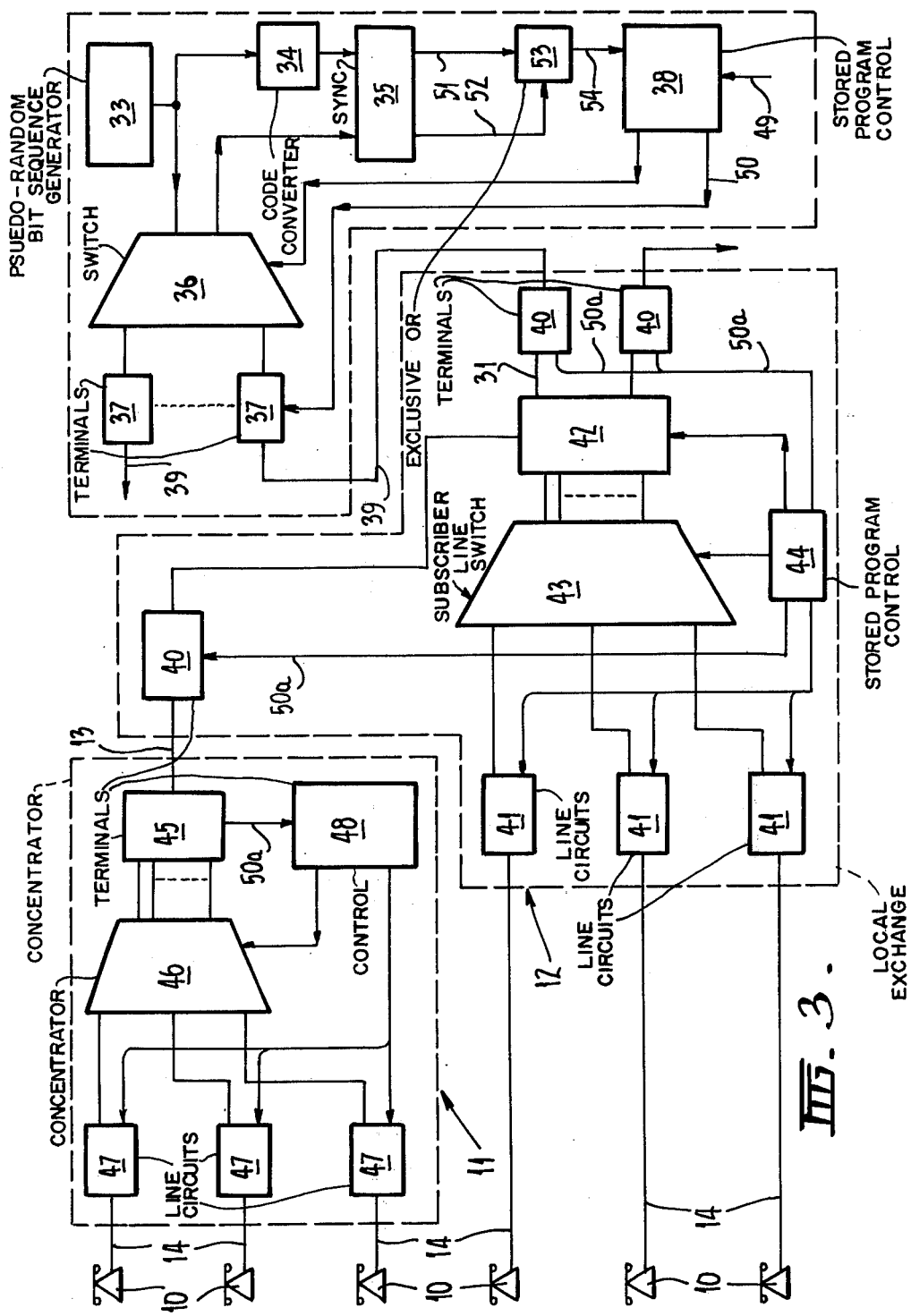

In order that the invention may more readily be understood particular embodiments will now be described in detail with reference to the accompanying drawings wherein:

FIG. 1 is a simplified block diagram of a digital telephone system of the kind to which the invention relates, FIG. 2(a): is a circuit block diagram of the power control circuits in a digital telephone of the system of FIG. 1, FIG. 2(b): is a circuit block diagram of an alternative embodiment of the power control circuits in a digital telephone of the system of FIG. 1, and FIG. 3: is a circuit block diagram showing a test centre for digitally testing lines to and from telephones of the system of FIG. 1 as well as greater detail about the local exchange and the digital concentrators of the system of FIG. 1.

Reference should now be made to FIG. 1 which shows a local exchange 12 connected via main cables 13 to a plurality of digital concentrators 11. The number of concentrators 11 will vary and may be increased as the system grows. Each main cable in this embodiment contains twenty lines (cable pairs). Six cable pairs (three for each direction) are used to transmit unidirectional speech data between the exchange 12 and the concentrator 11. The remaining cable pairs are used for power supply and servicing, etc. Each concentrator 11 is connected via individual cable pairs 14 to subscriber digital telephones 10. In this embodiment 400 telephone lines 14 are fed to each concentrator 11. The concentrators 11 provide a concentration of subscriber traffic by a factor of about four to one by time multiplexing thirty calls onto each of the cable pairs used for speech. Therefore up to about ninety calls may be made through a concentrator 11 before congestion occurs. One line of the main cable 13 is used to provide information to the exchange 12 relevant to the condition of each telephone 10. Information relevant to the condition of each telephone 10 is time multiplexed onto the one line of the main cable at the concentrator 11. All data from the telephones 10 is in digital form, the codes being generated directly in digital form and speech being converted into digital form by A/D convertors in the telephones.

Reference should now be made to FIG. 2(a) which shows the power control circuits in a digital phone 10.

The incoming and outgoing digital data bit streams in the telephone are separated by means of a hybrid 15 which may be a conventional transformer hybrid or resistive hybrid. Power is extracted from the subscribers line 14 in the telephone by a power extraction circuit 16 and is delivered to the circuits in the telephone which must always be powered up, that is, line receiver 17 and clock extraction circuit 18 as is indicated by the arrows Vcc as well as circuits 20 and 25. Power to the remaining circuits, that is, line driver 61, code convertor 26 and an encoder/decoder circuit block 60, is switched by means of switch 19 controlled by the output of an exclusive OR gate 20.

The clock extraction circuit 18 detects the presence or absence of clock signals in incoming di-phased data using a retriggerable monostable flip-flop (not shown). If there is an incoming bit stream to the telephone, the clock is detected by the circuit 18 which provides an output on connection 21 to the exclusive OR gate 20. The output of the gate 20 is responsible for operating the switch 19 to switch power to the remaining circuits such as digital decoder and amplifier 22 and digital encoder and keypad 23 all contained within circuit block 60. When the clock is missing there is no output on 21 and therefore the telephone is powered-down, that is, power is only supplied to those circuits which always require power. The clock extraction circuit 18 also provides a clock on its output C which goes to the devices of the telephone requiring a clock, as is indicated in the diagram by means of arrows labelled C.

The line receiver 17 incorporates a threshold circuit (not shown) to prevent self oscillation in the telephone which may be caused by line noise and hybrid unbalance.

In an alternative embodiment of the invention, shown in FIG. 2(b), clock is continually present, the power-down and power-up states being determined by the particular bit pattern sent to the telephone. If the incoming bitstream to the telephone consists of an assymetric pattern of ONES and ZEROS a simple integrating circuit 65 provides an output on connection 68 to the OR gate 67. The integrating circuit 65 and OR gate 67 are continually powered-up. The output of the OR gate controls switch 19 which supplies power to the remaining circuits such as the digital decoder and amplifier 22 and digital encoder and keypad 23 all contained within circuit block 60, the line driver 61, test code converter 26 and latch 66.

When the incoming bitstream to the telephone consists of a symmetric bit pattern such as clock or clock divided by two, the integrating circuit 65 produces zero output on 68 and the telephone remains powered-down, that is, power is supplied only to those circuits which need power as shown by Vcc in FIG. 2(a).

To avoid the possibility of a power-down whilst in the conversation mode, the output of the integrator 65 is applied to a latch circuit 66 which is allowed to latch when the phone is off hook, via switch 64. Thus the switch 19 is kept operated via OR gate 67 and latch 66 even if the bitstream on the line becomes symmetric (during long conversation pauses) on the incoming line. The integrating circuit 65 described above can be implemented using either analogue or digital techniques.

In the power control embodiment described with reference to FIG. 2(b), the receiver 17 does not need a threshold circuit. This makes the receiver more sensitive and therefore usable with longer lines between concentrator and the telephone.

The clock extractor 18 supplies a clock to all circuits that require a clock as indicated by C. The integrating circuit 65 may need a clock if it is a digital device.

The exchange must ensure that the signals to the telephone such as ring, dial tone and line test consist of assymetric ONE ZERO patterns so that integrating circuit 65 can operate. In the digital version of integrating circuit 65, digital decoding circuits would be used to detect the presence of the above signals.

According to the above embodiments if the switch hook 24 changes state, a monostable flip-flop 25 fires for about 50 ms and changes the power state of the telephone for that period in order to signal the local exchange 12 of the switch hook change of state. This momentary powering-up of the telephone is not strictly under the control of the local exchange but is for such a short period of time it cannot cause any adverse effects within the system.

For the purpose of digitally testing the lines 14, a code converter 26 is connected across the incoming and outgoing lines 27 and 28, respectively, between the hybrid 15 and the circuit block 60. The code converter may be a simple inverter circuit. The converter 26 is normally connected in circuit but is under switch hook control by means of switch 29 so that when a telephone goes off-hook the converter becomes open circuited and the digital encoder 23 is connected to the outgoing line 28 in place of the converter. As mentioned above it is impractical to provide conventional metallic connections in a digital system and the purpose of the code converter 26 is to enable digital testing. Metallic connections are impractical because they introduce technology interfaces, have large physical size and are unlikely to test the appropriate parameters which characterize the channel for digital operation. Accordingly this embodiment provides testing by means of digital bit error rate measurement. The exchange 12 is programmed to test the subscriber lines automatically during low traffic times usually during the night and does this by setting up a connection to a telephone at the end of a line to be tested, and powering up the telephone in question by transmitting diphased data to the telephone. The diphased data includes a particular code which is transmitted to the telephone, modified in a predetermined way by the converter 26 at the telephone and returned to the exchange 12. The exchange 12 then examines the returned data by counting the errors which occur in order to determine whether the line is acceptable for digital transmission. The purpose of modifying the particular code in a predetermined way by converter 26 is to ensure that the code has in fact reached the telephone and not merely been reflected back to the exchange by some fault in the line such as an open circuit.

In the alternative embodiment of the power control means (FIG. 2(b)) the diphase data sent to the telephone for testing will have an assymetric ONE-ZERO pattern to enable the phone to power-up.

The error rate may be artificially increased during the test period by reducing the signal to noise ratio (S/N ratio) on the line. This is done by temporarily reducing the transmitting signal voltage in the subscriber line circuits (FIG. 3). This ensures that the line is stressed during the test and also allows the error rate to be measured in a reasonable time. In this embodiment the S/N ratio on a good line is dropped to about 19 db during the test. By having determined the acceptable error rate for the line, the above measured error rate may be converted to what it would be for the proper S/N ratio and compared with the acceptable error rate to determine whether or not the line is up to standard.

The above described test procedures are implemented in the exchange 12 or at some hierarchial point in the system by a test centre including suitable software programming. The converter 26 may modify the code simply by inverting every nth bit in the sequence.

Reference should now be made to FIG. 3 which shows an embodiment of the test centre for line testing. The test centre 30 is shown as a remote test centre having access to the local exchange 12 and concetrator 11 via the digital network (that is, the remote test centre 30 accesses the local exchange 12 via a test inlet 31, on the switch 32 of exchange 12, similar to any other trunk inlet, and is switched via the local exchange to the relevant concentrator 11 of the network).

The test centre 30 consists essentially of a psuedo random bit sequence generator 33, a code convertor 34 (identical to the code convertor 26 in the telephones), a synchronization unit 35, a digital switch 36, digital terminal units 37 and a stored program control (SPC) 38, all arranged as shown in the drawing. The test centre 30 has access to local exchanges by connection 39.

A local digital exchange 12 is shown in more detail in FIG. 3 but since it does not form part of the invention it is only described at a level sufficient to enable an understanding of the testing operation. The digital exchange 12 is shown to comprise essentially digital terminal units 40 and subscriber line circuits 41 for interfacing the exchange with the outside world, as well as trunk switch 42, subscriber line switch 43 and stored program control 44. Connections 50a provide signalling information to and from the control 44.

Similarly, the digital concentrator 11 does not form part of the present invention and is shown in greater detail in FIG. 3 only to the extent necessary to describe the operation of this invention. The concentrator consists essentially of a digital terminal unit 45, a concentrator switch 46, subscriber line circuits 47 and control unit 48 connected as shown.

The test procedure is initiated in the test centre 30 by test information on connection 49. The test information on connection 49 is information relevant to the numbers of the subscriber lines to be tested and the times when the tests are to be carried out. The test information may also contain information about a previous test thus enabling a comparison to be made with the test in progress. Upon initiation of a test the test centre 30 sends a normal seizure signal on line 39 to the exchange 12 in question. The seizure signal is generated in the test centre by conventional means (not shown) and appears on signalling connection 50. The seizure signal is followed by the digits required to establish a connection through the network to the wanted subscribers' line. Since the seizure signal is received in the local exchange 12 on a special inlet 31 with "test" catagory marking the control 44, the exchange can take special action relative to the received call. Firstly control 44 can mark the inlet (on the subscribers line side of the switch 43) as being occupied on a test call. The control 44 then causes the subscribers line circuit 41 or 47 of the line in question to pre-set the transmission level to a lower value. In addition control 44 ensures inhibiting of ring cadence so that the ring circuit in the subscribers instrument is not activated under test conditions. When all special tasks pertaining to the test have been executed within local exchange 12, control 44 sends a seizure acknowledgement signal back to the test centre 30. The test centre 30 will then commence transmission of the psuedo random bit sequence (PRBS) from the generator 33 to the relevant subscribers instrument. The PRBS either contains a clock signal in the case of telephone instruments 10 according to the FIG. 2(a) embodiment or an assymetric one-zero pattern in the case of the FIG. 2(b) embodiments, in order that the telephone instrument will be switched to the power-up state as hereinbefore described. The powering up of the telephone enables the PRBS to be modified by the code convertor 26 (FIGS. 2(a) and 2(b)) and returned to the test centre 30 via the network. The transmission level between the subscribers instrument and the local exchange 12 in the return direction is not reduced in level although this could be done in an alternative form of the telephones (not shown) wherein the line drivers 61 in the subscribers instruments could be acted on to reduce the returned signal transmission level under test conditions.

The returned PRBS at the test centre 30 is switched via the switch 36 to the synchronization unit 35. The unit 35 also receives a PRBS from the generator 33 via code convertor 34 wherein it is modified in exactly the same manner as the PRBS sent to the subscribers instrument. The two bit sequences are synchronized in the unit 35 such that if no errors occur in the entire transmission path, the respective outputs on connections 51 and 52 from the unit 35 are identical. The output connections 51 and 52 are connected to the inputs of an exclusive OR gate 53 which of course only provides an output onto error connection 54 when the bits on the respective connections 51 and 52 differ. Connection 54 goes to the control 38 whereby the errors are counted and assessed as described below. The test must be capable of isolating the effects of errors caused by non gaussian noise from those caused by gaussian noise to enable the application of the relationship between error rate and signal-to-noise ratio for attainment of valid results. The system of the invention isolates the effects of burst errors(non-gaussian errors) from long term errors (gaussian errors) by making the test duration sufficiently long to prevent short term error bursts from masking the higher long term error rate which would prevail under test conditions (i.e. the higher error rate is due to the lower S/N ratio).

The error rate A, for example, which prevails during test conditions would, under normal transmission levels, correspond to a much lower error rate A' since there exists, with respect to gaussian noise, a mathematical relationship between error rate and S/N ratio. The S/N ratio during line testing may therefore be selected relative to the longest line so that the test error rate A assumes a value which is higher than a certain threshold level A'' if the line is degraded beyond a stipulated limit. Notwithstanding the possible occurrence of burst errors on the line under test the S/N ratio under test and hence the threshold error rate A'' is stipulated by the requirement of being able to obtain a reasonable error count during a given measuring interval.

When the test time expires the test centre 30 terminates the test by sending a clear forward signal to the local exchange involved in the test to initiate the clearing procedure which restores all equipment involved in the test to idle. The test centre may then establish a new test call as described above.

The test procedure also includes the possibility of aborting the test on any line or group of lines if the subscriber on the line under test or in the group under test attempts to make a call, that is, goes off-hook, or if an attempt is made to initiate a call to the subscriber whose line is under test or to any subscriber in a group of lines under test. Furthermore, the test may be aborted if any device within the telephone instrument, concentrator or local exchange causes failure to establish the required connection. In the case of a disconnected telephone the test may be aborted until the telephone instrument is reconnected to the line.

As mentioned above the test centre 30 may be placed at the local exchange 12 or elsewhere in the network.

Furthermore, the test centre logic (SPC 38) only, may be placed at the local exchange or concentrator whilst the remainder of the test centre may be placed elsewhere in the system thus enabling use of part of the SPC or any other control facility already available for switching, signalling and control.

As will be apparent from the above description, the invention provides an improved digital communication system which enables remote digital data terminals to be effectively switched off from a central (local) exchange when not in use. Of course the terminals are not switched completely off because some circuits in the terminals must always have power supplied to them, but since this power is extremely low relative to the full operating power of the terminals they may be considered as being turned off. In this manner the number of terminals which are switched into the 'on' or powered-up condition may be controlled at the local exchange. Thus, if an unusually high number of terminals require power at the same time and there is a danger that the power supplies will be caused to sag, the exchange is capable of assessing the situation and cause only the number of terminals which can be adequately supplied without causing undue power sag to be powered up. This is achieved in the control at the local exchange. Accordingly there is a saving in expensive cabling by using digital concentrators between local exchanges and subscriber terminals and also there is a saving in power consumed by the terminals.

The ability to control the power state of the terminals from the exchange also facilitates the digital testing described above whereby the lines to and from the subscriber terminals may be tested in a manner which indicates the condition of the lines regarding those parameters which are relevant to digital testing.

We claim:

1. A method for controlling the power state of remote data terminals in a digital communication system of the kind wherein power for the terminals is supplied from a central switching station, said method comprising controlling the digital signal transmitted to said terminals from said central switching station to cause said terminals to assume either a power-up state wherein continuous operating power is consumed by said terminals or a power-down state wherein a small amount of power is consumed by said terminals, said small amount of power being sufficient only to enable said terminals and said central switching station to communicate, the switching of a terminal from the power-down state to the power-up state being made at the terminal when said digital signal transmitted includes a particular control signal.

2. A method for controlling the power state of remote data terminals in a digital communication system of the kind wherein power for the terminals is supplied from a central switching station, said method comprising the steps of controlling the digital signal transmitted to said terminals from said central switching station to cause said terminals to assume either a power-up state wherein continuous operating power is consumed by said terminals or a power-down state wherein a small amount of power is consumed by said terminals, said small amount of power being sufficient only to enable said terminals and said central switching station to communicate, the switching of a terminal from the power-down state to the power-up state being made at the terminal when said digital signal transmitted includes a particular control signal, and transmitting said particular control signal to a terminal of said system only when the change of state of that terminal to the power-up state will not cause the exceeding of an allowable sum of power rationed for the terminals of the system.

3. A method according to claim 1 wherein said system is a telephone system and each said terminal is a digital telephone, said particular control signal being a clock signal included in di-phased data transmitted to the telephones, said method further including causing a telephone to momentarily switch from the power-down state to the power-up state when the telephone goes into the off-hook condition to initiate a call, so as to signal the central switching station of the need for continuous operating power, said momentary switching to the power-up state not being of sufficient time to affect the sum of the power being consumed by the telephones of the system.

4. A method according to claim 2 wherein said system is a telephone system and each said terminal is a digital telephone, said particular control signal being an asymmetric bit pattern of ONES and ZEROS, said method further including latching a telephone into the power-up state when said telephone is in the 'off-hook' condition to avoid a change to the power-down state should said asymmetric bit pattern cease momentarily during a conversation mode.

5. A method according to claim 4 further including causing a telephone to momentarily switch from the power-down state to the power-up state when the telephone goes into the 'off-hook' condition to initiate a call, so as to signal the central switching station of the need for continuous operating power, said momentary switching to the power-up state not being of sufficient time to affect the sum of the power being consumed by the telephones of the system.

6. A method for controlling the power state of remote data terminals in a digital communication system of the kind wherein power for the terminals is supplied from a central switching station, said method comprising controlling the digital signal transmitted to said terminals from said central switching station to cause said terminals to assume either a power-up state wherein continuous operating power is consumed by said terminals or a power-down state wherein a small amount of power is consumed by said terminals, said small amount of power being sufficient only to enable said terminals and said central switching station to communicate, the switching of a terminal from the power-down state to the power-up state being made at the terminal when said digital signal transmitted includes a particular control signal, transmitting said control signal from said central switching station to a preselected terminal of the system, when said preselected terminal is not in use to cause said preselected terminal to assume said power-up state, transmitting a pseudo random bit stream from a test center located at said switching station or at some hierarchical point in the system, to said preselected terminal, modifying said pseudo random bit stream in a predetermined manner at said preselected terminal, transmitting said modified pseudo random bit stream back to said test center, and counting the errors which have occurred during transmission to enable assessment of the quality of digital line transmission between said switching station and said preselected terminal.

7. A method according to claim 6 further including the step of reducing the signal to noise ratio on the line under assessment to increase the error rate and enable a meaningful assessment to be achieved in a short period of time.

8. An arrangement for controlling the power state of remote data terminals in a digital communication system of the kind wherein power for the terminals is supplied from a central switching station, said arrangement including a power rationing switch in each terminal for switching said terminal between a power-down state wherein a small amount of power is consumed by said terminal and a power-up state wherein continuous operating power is consumed by said terminal, said small amount of power being sufficient only to enable said terminal and said central switching station to communicate, and a detector in each terminal for actuating said power rationing switch depending on a particular control signal in the digital bit stream received by said terminal to switch said terminal to said power-up state, said detector also being adapted to actuate said switch to momentarily switch said terminal to the power-up state depending on a change in said terminal from an idle to a busy condition when initiating a communicating from said terminal, so as to signal said central switching station of said change.

9. An arrangement according to claim 8 wherein said detector includes a circuit for carrying out an OR function between a continuous signal representing said particular control signal and a short duration pulse signal representing said change in said terminal from an idle to a busy condition, the output of said circuit actuating said switch.

10. An arrangement according to claim 9 wherein said control signal is the clock signal in di-phased data transmitted to said terminal, said detector further including a clock extraction circuit for extracting said clock signal and providing at one of its outputs said continuous signal.

11. An arrangement according to claim 9 wherein said control signal comprises an asymmetric bit pattern of ONES and ZEROS, said detector including an integrating circuit for detecting said asymmetric bit pattern and providing said continuous signal, said continuous signal also being provided at a latch circuit within said detector, said latch circuit ensuring that said continuous signal always appears on an input of said OR circuit whilst said terminal remains in the busy condition after said asymmetric bit pattern has been received.

12. An arrangement according to claim 11 wherein said momentary switching of a terminal to the power up state signals said central switching station that the terminal requires continuous operating power, said central switching station including a power rationing unit for preventing transmission of said control signal to a terminal if a change from said idle to said busy condition has been signalled and if switching said terminal to the power-up state would cause exceeding of an allowable sum of power ration for the terminals of the system.

13. An arrangement according to claim 8 further including a test centre for digitally testing the lines between said terminals and said central switching station, said test centre including a digital test signal generator for generating a digital test signal, first circuit means for transmitting said test signal to a terminal, a signal converter and line circuit means in each terminal for modifying said test signal in a particular way and transmitting said modified test signal back to said test centre, a further signal converter in said test centre for modifying a non-transmitted version of said test signal within said test centre in said particular way, and second circuit means in said test centre for comparing said modified non-transmitted version of said test signal with the returned modified signal enabling the errors which have occurred during transmission to be counted.

14. An arrangement according to claim 13 including a line circuit for each line, said line circuits being controllable to reduce the signal to noise ratio on the line under test for the duration of the test.

15. A method for digitally testing lines between digital terminals and a central switching station in a digital communication system, said method including the steps of generating a digital test signal, transmitting said test signal from said switching station to a terminal, modifying said test signal at said terminal, transmitting said modified test signal back to said switching station, counting the errors which occur by comparing the returned test signal with a similarly modified non-transmitted signal, reducing the signal to noise ratio on the line under test at least for the transmission from said station to said terminal to enable a reasonable error count in a short time, and assessing the error count to establish the transmission quality of the line.

16. An arrangement for digitally testing lines between digital terminals and a central switching station in a digital communication system, said arrangement including a test centre comprising a digital test signal generator for generating a digital test signal, first circuit means for transmitting said test signal to a terminal, a signal converter and line circuit means in each terminal for modifying said test signal in a particular way, and transmitting said modified test signal back to said test centre, a further signal converter in said test centre for modifying a non-transmitted version of said test signal within said test centre in said particular way, and a second circuit means in said test centre for comparing said modified non-transmitted version of said test signal with the returned modified signal to enable counting of the errors which have occurred during transmission.

17. An arrangement according to claim 16 including a line circuit for each line, said line circuits being controllable to reduce the signal to noise ratio on the line under test for the duration of the test.

18. An arrangement according to claim 17 wherein said second circuit means includes a synchronising unit for synchronizing said non-transmitted and returned test signals and an EXCLUSIVE-OR circuit for receiving said synchronized signals and providing an output when said synchronized signals are different, said output being a count of the error occurring in transmission.

19. A method of controlling the power state of remote date terminals in a digital communication system of the kind wherein power for the terminals is supplied from a central switching station, said method comprising the steps of: (i) controlling the digital signal transmitted to said terminals from said central switching station to cause said terminals to assume either a power-up state wherein continuous operating power is consumed by said terminals or a power-down state wherein a small amount of power is consumed by said terminals and (ii) causing said small amount of power to be sufficient only to enable said terminals to recognize a particular digital control signal in said transmitted digital signal, the switching of a terminal from the power-down state to the power-up state being made at the terminal when said digital signal transmitted includes said particular control signal.

20. A method for controlling the power state of remote data terminals in a digital communication system of the kind wherein power for the terminals is supplied from a central switching station, said method comprising the steps of (i) providing continuous operating power at the terminals of the system, and (ii) controlling the digital signal transmitted to said terminals from said central switching station to cause said terminals to assume either a power-up state wherein continuous operating power is consumed by said terminals or a power-down state wherein a small amount of power is consumed by said terminals, said small amount of power being sufficient only to enable said terminals and said central switching station to communicate, the switching of a terminal from the power-down state to the power-up state being made at the terminal when said digital signal transmitted includes a particular control signal.

21. A method for controlling the power state of remote data terminals in a digital communication system of the kind wherein power for the terminals is supplied from a central switching station, said method comprising (i) selectively controlling the digital signal transmitted to said terminals from said central switching station, such that said signal may include a particular control signal and (i) detecting said particular control signal at a terminal and in response thereto switching said terminal from a power-down state wherein a small amount of power is consumed by said terminals to a power-up state wherein continuous operating power is consumed by said terminals, said small amount of power being sufficient only to enable said terminals to recognize said particular control signal and respond thereto.

* * * * *